United States Patent
Dong et al.

(10) Patent No.: US 12,430,040 B2
(45) Date of Patent: Sep. 30, 2025

(54) METHOD, ELECTRONIC DEVICE, AND COMPUTER PROGRAM PRODUCT FOR DATA REPLICATION

(71) Applicant: Dell Products L.P., Round Rock, TX (US)

(72) Inventors: Helen Dong, Chengdu (CN); Xuhui Yang, Chengdu (CN); Renyuan Tong, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 18/536,166

(22) Filed: Dec. 11, 2023

(65) Prior Publication Data

US 2025/0110646 A1     Apr. 3, 2025

(30) Foreign Application Priority Data

Sep. 28, 2023   (CN) .......................... 202311285259.0

(51) Int. Cl.
*G06F 3/06* (2006.01)

(52) U.S. Cl.
CPC ............ *G06F 3/0619* (2013.01); *G06F 3/065* (2013.01); *G06F 3/0685* (2013.01)

(58) Field of Classification Search
CPC ...... G06F 3/0619; G06F 3/065; G06F 3/0685; G06F 3/0679

USPC ......................................................... 711/162
See application file for complete search history.

(56) References Cited

U.S. PATENT DOCUMENTS

| | | | | |
|---|---|---|---|---|
| 8,825,964 B1 * | 9/2014 | Sopka | ................... | G06F 9/4856 |
| | | | | 711/E12.001 |
| 2013/0262801 A1 * | 10/2013 | Sancheti | ............. | H04L 67/1097 |
| | | | | 711/162 |
| 2021/0089224 A1 * | 3/2021 | Beeston | ................ | G06F 3/0647 |

\* cited by examiner

*Primary Examiner* — Than Nguyen
(74) *Attorney, Agent, or Firm* — Amin, Turocy & Watson, LLP

(57) ABSTRACT

Data replication is described. An example method includes determining an aging degree of a first-type storage disk in a source storage device and determining a transmission time length for replicating target data from a second-type storage disk in the source storage device to a destination storage device, wherein the target data is stored in the second-type storage disk in the source storage device. Based on the transmission time length and the aging degree, it can be determined to migrate the target data from the second-type storage disk to the first-type storage disk, and, accordingly, the target data can be replicated from the first-type storage disk in the source storage device to the destination storage device. The data replication of the described technology can significantly improve data replication efficiency, and reduce the possibility of data loss, thereby significantly improving the performance of a storage system.

20 Claims, 11 Drawing Sheets

METHOD, ELECTRONIC DEVICE, AND COMPUTER PROGRAM PRODUCT FOR DATA REPLICATION

RELATED APPLICATION

The present application claims the benefit of priority to Chinese Patent Application No. 202311285259.0, filed on Sep. 28, 2023, which application is hereby incorporated into the present application by reference herein in its entirety.

TECHNICAL FIELD

Embodiments of the present disclosure relate to the field of storage technologies, and more specifically, to a method, an electronic device, and a computer program product for data replication.

BACKGROUND

With the continuous increase in business demands, the data volume related to business also increases exponentially. Data replication is an important component of a disaster recovery plan for either a large organization or a small organization. The data replication technology refers to the technology of replicating data from a source storage device to a destination storage device in order to achieve disaster recovery or improve accessibility. By using the data replication technology, storing data as backup on the destination storage device can prevent data loss caused by operational errors or failures of the source storage device caused by various reasons.

SUMMARY

The following presents a simplified summary of the disclosed subject matter in order to provide a basic understanding of some example embodiments of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

Example embodiments of the present disclosure provide a method, an electronic device, and a computer program product for data replication.

According to a first example embodiment of the present disclosure, a method for data replication is provided. The method includes determining an aging degree of a first-type storage disk in a source storage device. The method further includes determining a transmission time length for replicating target data from a second-type storage disk in the source storage device to a destination storage device, wherein the target data is stored in the second-type storage disk in the source storage device. The method further includes determining, based on the transmission time length and the aging degree, to migrate the target data from the second-type storage disk to the first-type storage disk, and replicating the target data from the first-type storage disk in the source storage device to the destination storage device.

According to a second example embodiment of the present disclosure, an electronic device is provided. The electronic device includes at least one processor; and a memory, coupled to the at least one processor and having instructions stored thereon, wherein the instructions, when executed by the at least one processor, cause the device to perform actions including: determining an aging degree of a first-type storage disk in a source storage device; determining a transmission time length for replicating target data from a second-type storage disk in the source storage device to a destination storage device, wherein the target data is stored in the second-type storage disk in the source storage device; determining, based on the transmission time length and the aging degree, to migrate the target data from the second-type storage disk to the first-type storage disk; and replicating the target data from the first-type storage disk in the source storage device to the destination storage device.

According to a third example embodiment of the present disclosure, a computer program product is provided. The computer program product is tangibly stored on a non-volatile computer-readable medium and includes machine-executable instructions, wherein the machine-executable instructions, when executed, cause a machine to perform steps of the method in the first example embodiment of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, wherein identical reference numerals generally represent identical components in the example embodiments of the present disclosure.

In various accompanying drawings, identical or corresponding reference numerals represent identical or corresponding parts.

DETAILED DESCRIPTION

The embodiments of the present disclosure will be described below in further detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Figure 1:
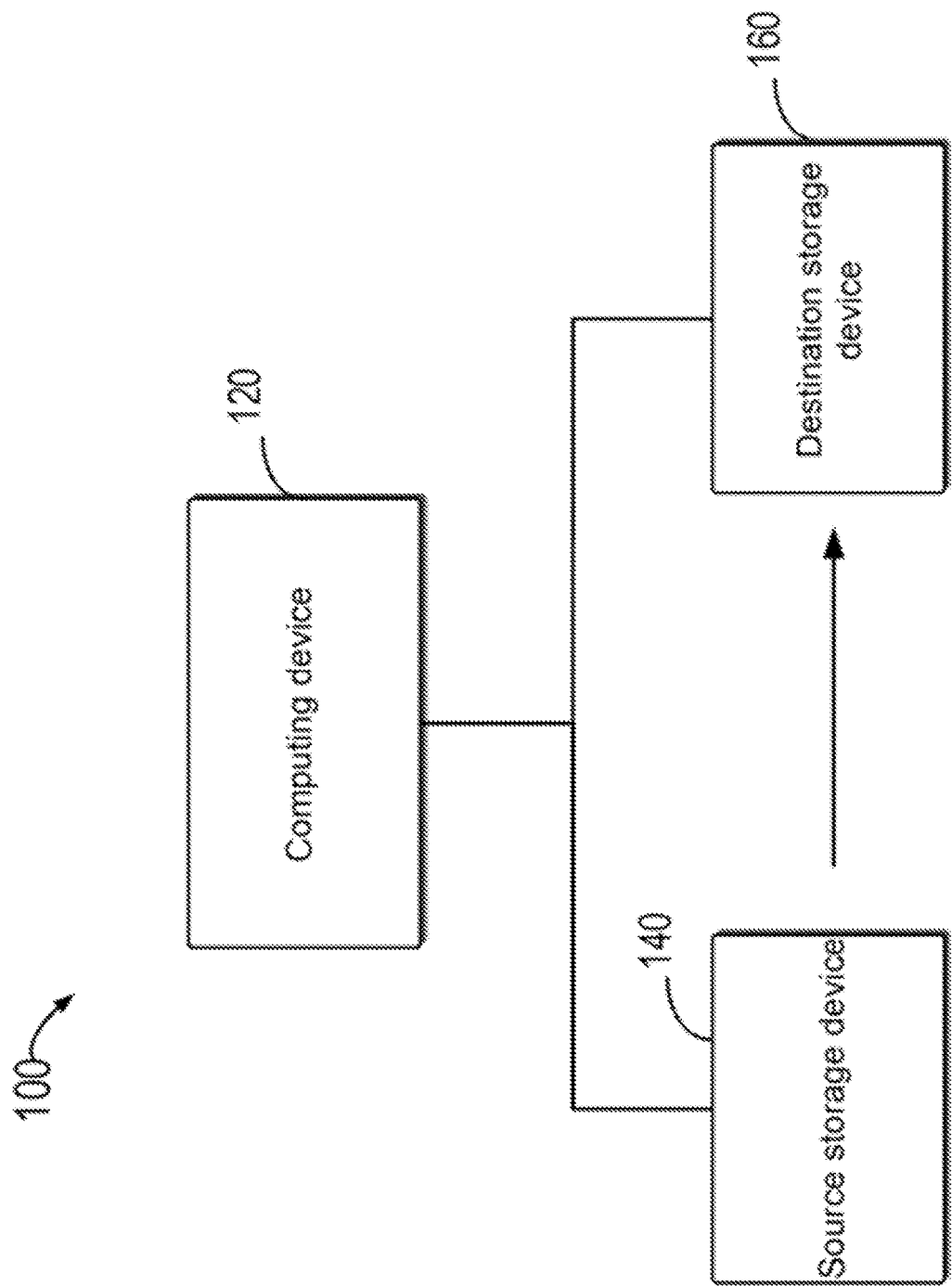
FIG. 1 shows a schematic diagram of an example environment capable of implementing data replication.

The data replication technology refers to the technology of replicating data from a source storage device to a destination storage device in order to achieve disaster recovery or improve accessibility. As the volume of data in the source storage device gradually increases, the volume of data replicated to the destination storage device also gradually increases. Currently, there are usually two implementation methods for the data replication technology: Synchronous data replication and asynchronous data replication. An implementation process of data replication will be further described in detail with reference to the accompanying drawings below. FIG. 1 is a schematic diagram of an example environment capable of implementing data replication according to an embodiment of the present disclosure.

In the example environment shown in FIG. 1, a storage system 100 capable of implementing data replication is shown. The storage system 100 may include various storage systems such as a distributed storage system. The storage system 100 includes a computing device 120, a first storage device 140, and a second storage device 160. For data replication, illustration will be made by taking the first storage device 140 being a source storage device and the second storage device 160 being a destination storage device as an example. It is understandable that it is only illustrative.

For the synchronous data replication, a user writes data to the source storage device 140 through a client (not shown). Then, the source storage device 140 replicates the received data to the destination storage device 160. After receiving the data from the source storage device 140, the destination storage device 160 may return an acknowledgment signal, such as ACK, to the source storage device 140. The source storage device 140 then sends the acknowledgment signal to the client, thereby achieving the synchronous data replication.

For the asynchronous data replication, the user writes data to the source storage device 140 through the client. Then, the source storage device 140 processes the received data and, after completing the processing, sends information indicating that the processing has been completed to the client. Afterwards, the source storage device 140 may send the accumulated data to the destination storage device 160 at an interval, thereby achieving the asynchronous data replication.

For the asynchronous data replication, the "at an interval" mentioned above may correspond to a recovery point objective (RPO). The recovery point objective refers to the volume of data loss that is tolerable by the business system when the source storage device 140 fails. Usually, the RPO is measured in units of time and has corresponding time lengths based on the specific requirements of the storage system 100, such as 8 hours, 4 hours, 1 hour, 0.5 hours, and 10 minutes.

When the source storage device 140 fails, whether data can be recovered from the destination storage device 160 depends to some extent on a time point at which the source storage device 140 fails. For example, when a fault occurs in the process of transmitting data to be replicated within the RPO time window, the data to be replicated may be lost. When the volume of data to be replicated is large, the data to be replicated may also be lost if the source storage device fails. Therefore, there is an urgent need for an effective data replication method that can reduce the possibility of data loss and improve the storage system performance.

To at least address the aforementioned technical issues, a data replication method according to an embodiment of the present disclosure is proposed. The data replication method according to the embodiment of the present disclosure includes determining an aging degree of a first-type storage disk in a source storage device. The method further includes determining a transmission time length for replicating target data from a second-type storage disk in the source storage device to a destination storage device, wherein the target data is stored in the second-type storage disk in the source storage device. The method further includes determining, based on the transmission time length and the aging degree, to migrate the target data from the second-type storage disk to the first-type storage disk, and replicating the target data from the first-type storage disk in the source storage device to the destination storage device.

According to the embodiment of the present disclosure, before data replication, by migrating the target data from the second-type storage disk with relatively low performance to the first-type storage disk with relatively high performance, the data replication efficiency can be significantly improved, the possibility of data loss can be reduced, and the performance of the storage system can be significantly improved.

Figure 2:
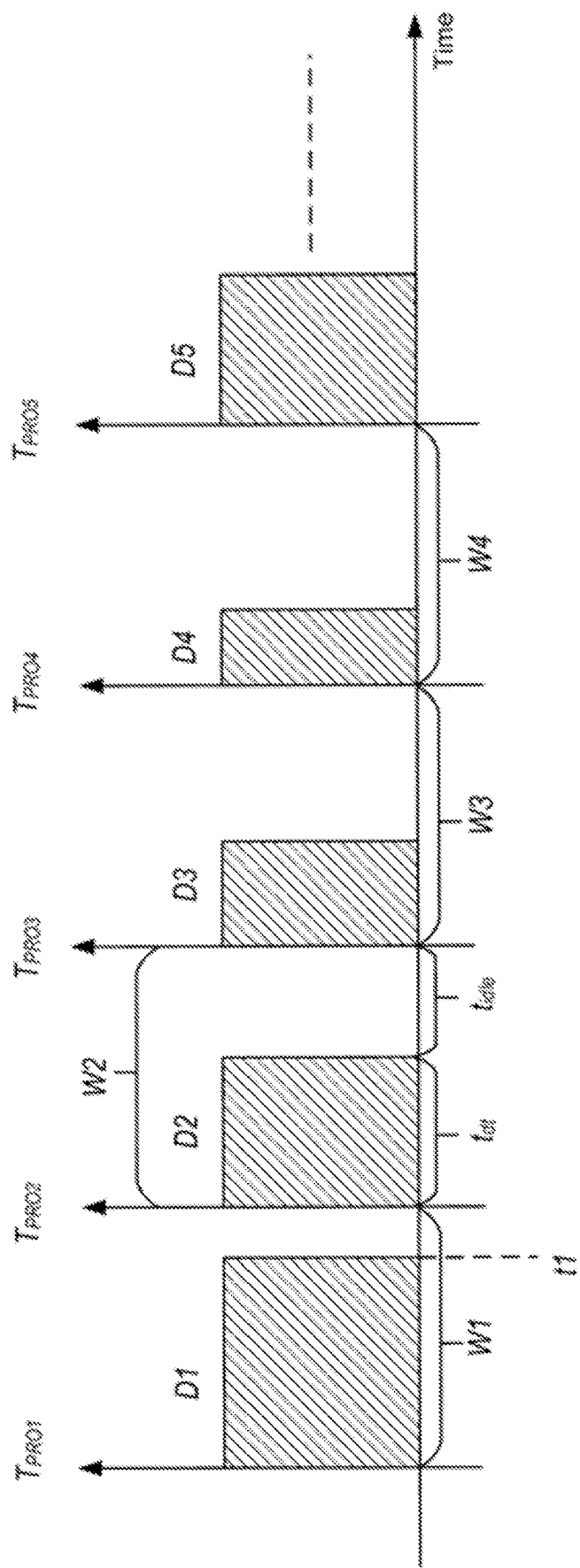
FIG. 2 shows a schematic diagram of an asynchronous data replication process scheduled by Recovery Point Objective (RPO)

FIG. 2 shows a schematic diagram of an asynchronous data replication process scheduled by recovery point objective (RPO). According to the asynchronous data replication technology, the source storage device 140 may create data replicates based on predetermined requirements and, under the periodic triggering of the PRO, replicate the data replicates to the destination storage device 160. For simplicity, in the following text, the data replicate is referred to as "target data," which refers to data to be replicated from the source storage device 140 to the destination storage device 160.

FIG. 2 illustrates a plurality of time windows. Each time window corresponds to each RPO time length. Each RPO is triggered by a corresponding triggering moment, and a time period between two triggering moments is the corresponding RPO time length. As shown in FIG. 2, a first RPO is triggered by a first moment $T_{RPO1}$, a second RPO is triggered by a second moment $T_{RPO2}$, a third RPO is triggered by a third moment $T_{RPO3}$, a fourth RPO is triggered by a fourth moment $T_{RPO4}$, a fifth RPO is triggered by a fifth moment $T_{RPO5}$, and so on. The time period between two triggering moments is the corresponding RPO time length or a corresponding time window. For example, as shown in FIG. 2, a time length between the first moment $T_{RPO1}$ and the second moment $T_{RPO2}$ corresponds to a time window W1, a time length between the second moment $T_{RPO2}$ and the third moment $T_{RPO3}$ corresponds to a time window W2, a time length between the third moment $T_{RPO3}$ and the fourth moment $T_{RPO4}$ corresponds to a time window W3, and a time length between the fourth moment $T_{RPO4}$ and the fifth moment $T_{RPO5}$ corresponds to a time window W4. In addition, the interval between two triggering moments may be equal, and in other words, data replication is triggered periodically. It is understandable that in the process of data replication, the length of the triggering time interval may be adjusted. Moreover, it is further understandable that the figure in FIG. 2 is only illustrative, and the first moment does not refer to an initial moment. Instead, it may refer to any moment in the data replication process. Moreover, the process of data replication may include more than 5 or less than 5 triggering moments, which is not limited in the present disclosure.

Shaded blocks in FIG. 2 may represent the target data. For example, taking the time window W1 as an example, within the time window, data D1 is replicated from the source storage device 140 to the destination storage device 160, and replication is completed at a moment t. The moment t1 is within the time window W1. Moreover, within the time window W1, the storage system 100 has no failure occurred. Afterwards, the data replication process may enter an RPO time window triggered by the next triggering moment $T_{RPO2}$, and replicate the next piece of target data D2 to the destination storage device, and so on.

In a time window Wi defined by two adjacent PRO triggering moments, the time window Wi may be divided into two sub windows: a data transmission sub window (corresponding to a time length $t_{dt}$) used for transmitting replicated data and an idle sub window (corresponding to a time length $t_{idle}$) corresponding to the time after completion of data transmission. Moreover, the time length $t_{dt}$ corresponding to the data transmission sub window and the time length $t_{idle}$ corresponding to the idle sub window meet the following equation:

$$t_{dt} + t_{idle} = WRPO \quad (1)$$

wherein the WRPO corresponds to the RPO time window length defined by the two adjacent PRO triggering moments (for example, $T_{RPOn}$ and $T_{RPO(n+1)}$).

In the PRO time window defined by the two adjacent PRO triggering moments, a ratio of the time length $t_{dt}$ of the data transmission sub window to the time length WRPO of the PRO time window may be expressed as the following equation (2):

$$r_{dt} = \frac{t_{dt}}{WRPO} \quad (2)$$

wherein WRPO represents the time length of the PRO time window defined by the two adjacent PRO triggering moments. If the value of $r_{dt}$ is relatively small, once the source storage device 140 fails, the probability of the replicated target data being lost during the time window is relatively low as the data transmission sub window $t_{dt}$ occupies a relatively small part within the time window. On the contrary, if the value of $r_{dt}$ is relatively large, once the source storage device 140 fails, the probability of the replicated target data being lost within the time window may be relatively high as the data transmission sub window $t_{dt}$ occupies a relatively large part within the time window.

By adopting the data replication method according to the embodiment of the present disclosure, the problem of data loss caused by the failure of the source storage device 140 within the data transmission sub window may be effectively solved, especially when the value of $r_{dt}$ is relatively large.

Figure 3:
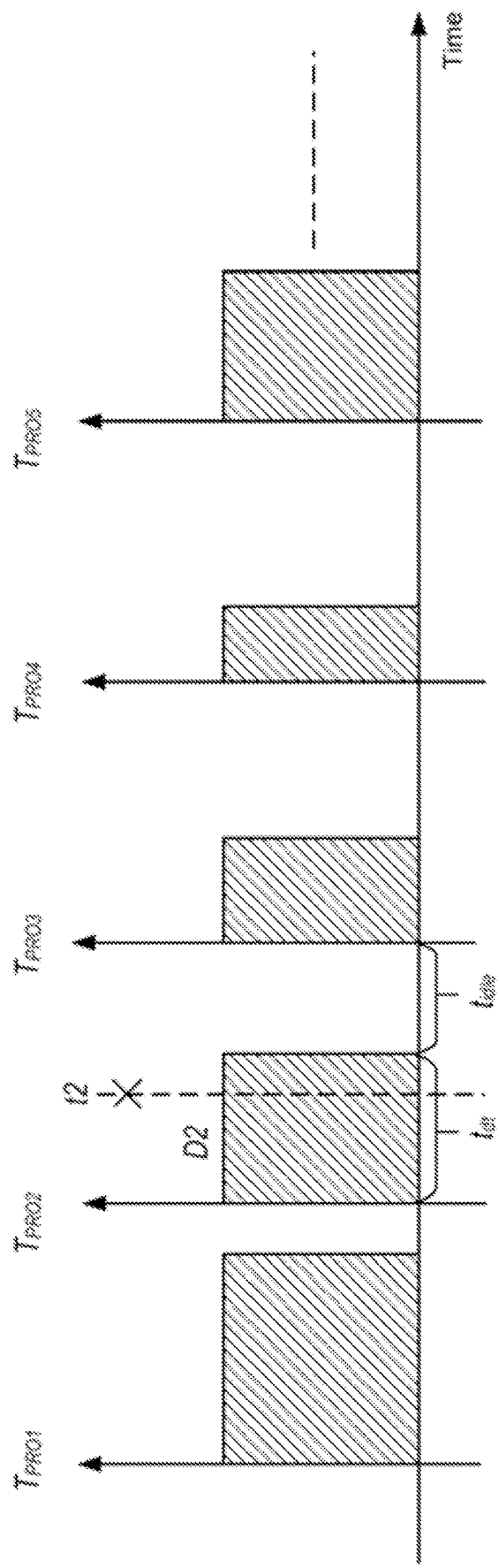
FIG. 3 shows a schematic diagram of a case when a source storage device fails within an RPO time window.

Illustration is made by taking FIG. 3 as an example. FIG. 3 shows a schematic diagram of a source storage device 140 failing within an RPO time window. In FIG. 3, in a PRO time window defined by two adjacent PRO triggering moments (such as the second moment $T_{RPO2}$ and the third moment $T_{RPO3}$), when the source storage device 140 fails at a time t2 (t2 is located in the data transmission sub window), by using the data replication method according to the embodiment of the present disclosure, data D2 may be transmitted to a destination storage device before the t2 moment. In this way, all of the target data D2 may be replicated to the destination storage device 160 before the failure, thereby avoiding data loss.

In addition, by adopting the data replication method according to the embodiment of the present disclosure, the problem of data loss that may exist when the volume of data to be replicated is large may also be effectively solved.

Figure 4:
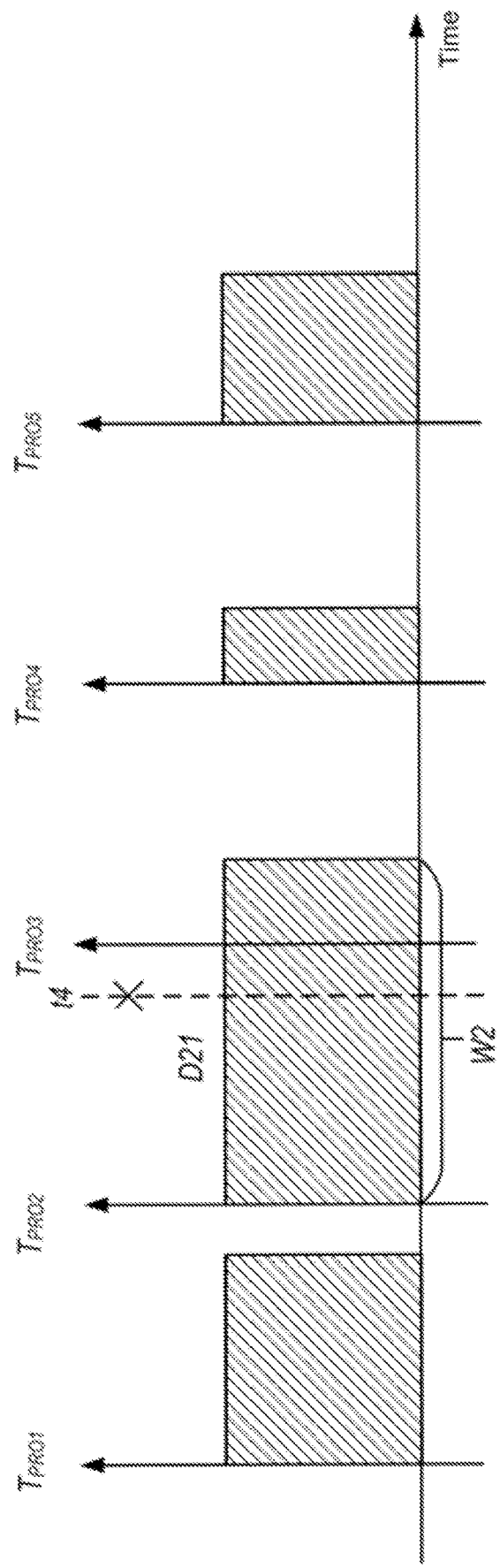
FIG. 4 shows a schematic diagram in a case of a large volume of target data.

For example, FIG. 4 shows a schematic diagram of a situation where the target data may be lost when the data volume of the target data is large. In response to the large volume of data to be replicated in FIG. 4, the data replication method according to the embodiment of the present disclosure may be adopted, so that data D21 may be transmitted to the destination storage device before the moment t4 when the failure occurs, thereby avoiding data loss.

It is understandable that the device and/or method according to the embodiment of the present disclosure may be implemented in the example environment 100 in FIG. 1. In FIG. 1, although not shown, it is understandable that the computing device 120 may be connected to the source storage device 140 and the destination storage device 160 through a network 150. The network 150 includes, but is not limited to, the Internet, a local area network, a wireless network, and other various types of networks. In addition, those skilled in the art may further understand that the computing device 120 may also be connected to and in communication with the source storage device 140 and the destination storage device 160 through various types of buses or lines, which is not limited in the present disclosure. In addition, the source storage device 140 and the destination storage device 160 may be connected in various manners, which is not limited in the present disclosure, either. Furthermore, although FIG. 1 illustrates one source storage device 140 and one destination storage device 160, it is understandable that the storage system 100 may include any number of source storage devices 140 and destination storage devices 160. In addition, the source storage device 140 and the destination storage device 160 are also relative. For example, when the storage device 160 in FIG. 1 replicates data to the storage device 140, the storage device 140 may be the destination storage device relative to the storage device 160, and the storage device 160 may be the source storage device relative to the storage device 140.

Figure 5:
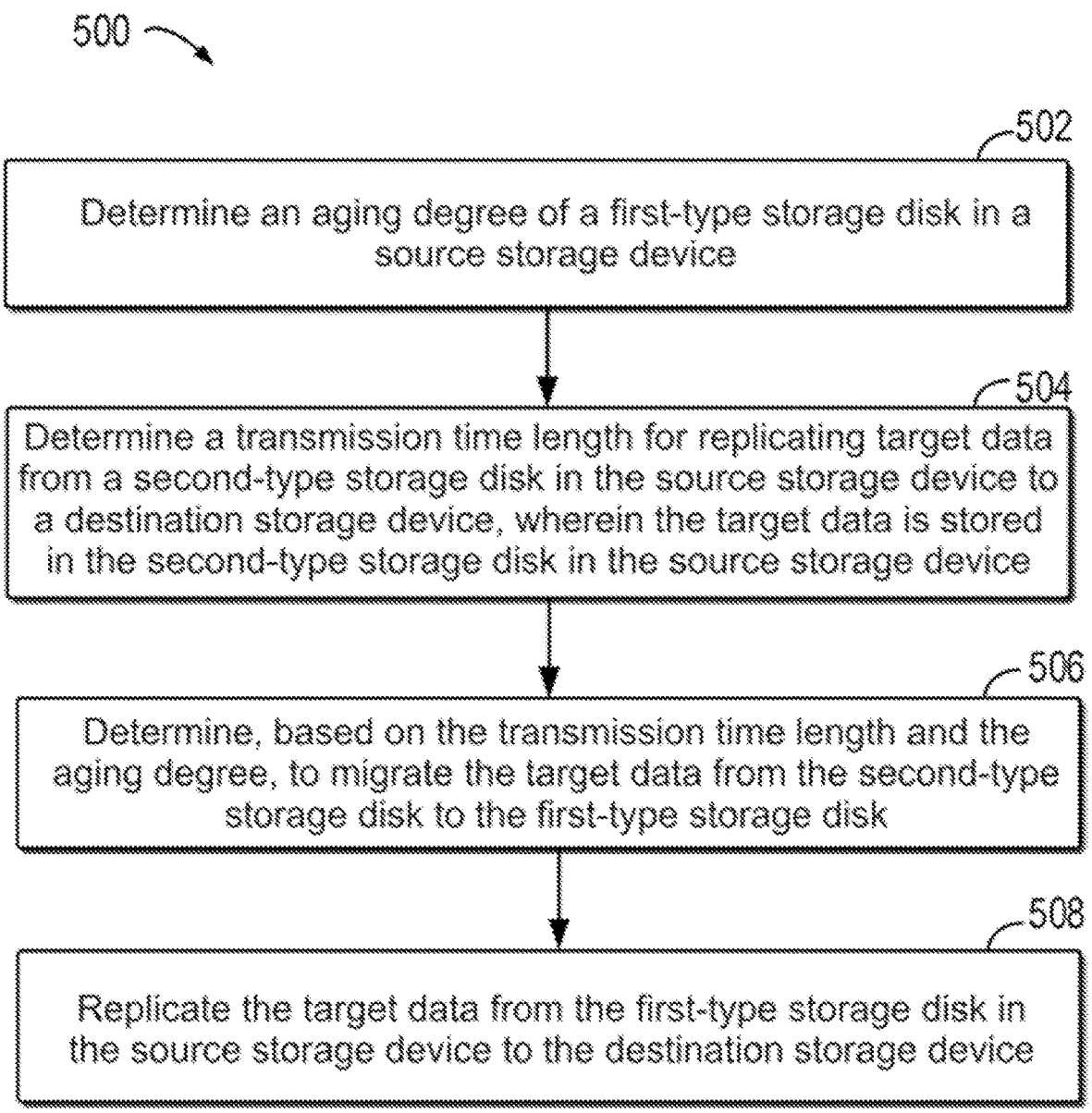
FIG. 5 shows a flow chart of a method for data replication according to an embodiment of the present disclosure.

A flow chart of a method 500 for data replication according to an embodiment of the present disclosure will be described below with reference to FIG. 5. FIG. 5 shows a flow chart of a method 500 for data replication according to an embodiment of the present disclosure. The method 500 may be performed at computing device 120 in the storage system 100 in FIG. 1 or at any suitable computing device.

At a block 502, the computing device 120 determines an aging degree of a first-type storage disk in a source storage device 140. In some embodiments, the aging degree characterizes an aging state of the first-type storage disk.

In some embodiments, the source storage device 140 may include a hybrid storage device, and the speed and type of storage disks in the hybrid storage device are hybrid. For this hybrid type of storage device, the storage device may include two or more types of storage disks. In some embodiments, the storage device (the source storage device 140 or the destination storage device 160) according to the embodiment of the present disclosure may be a hybrid storage device. The hybrid storage device includes but is not limited to a solid-state drive SSD and a mechanical hard drive HDD. Those skilled in the art may understand that the performance of SSD is better than that of HDD. For example, the read and write speed of SSD is faster than that of HDD.

Figure 6:
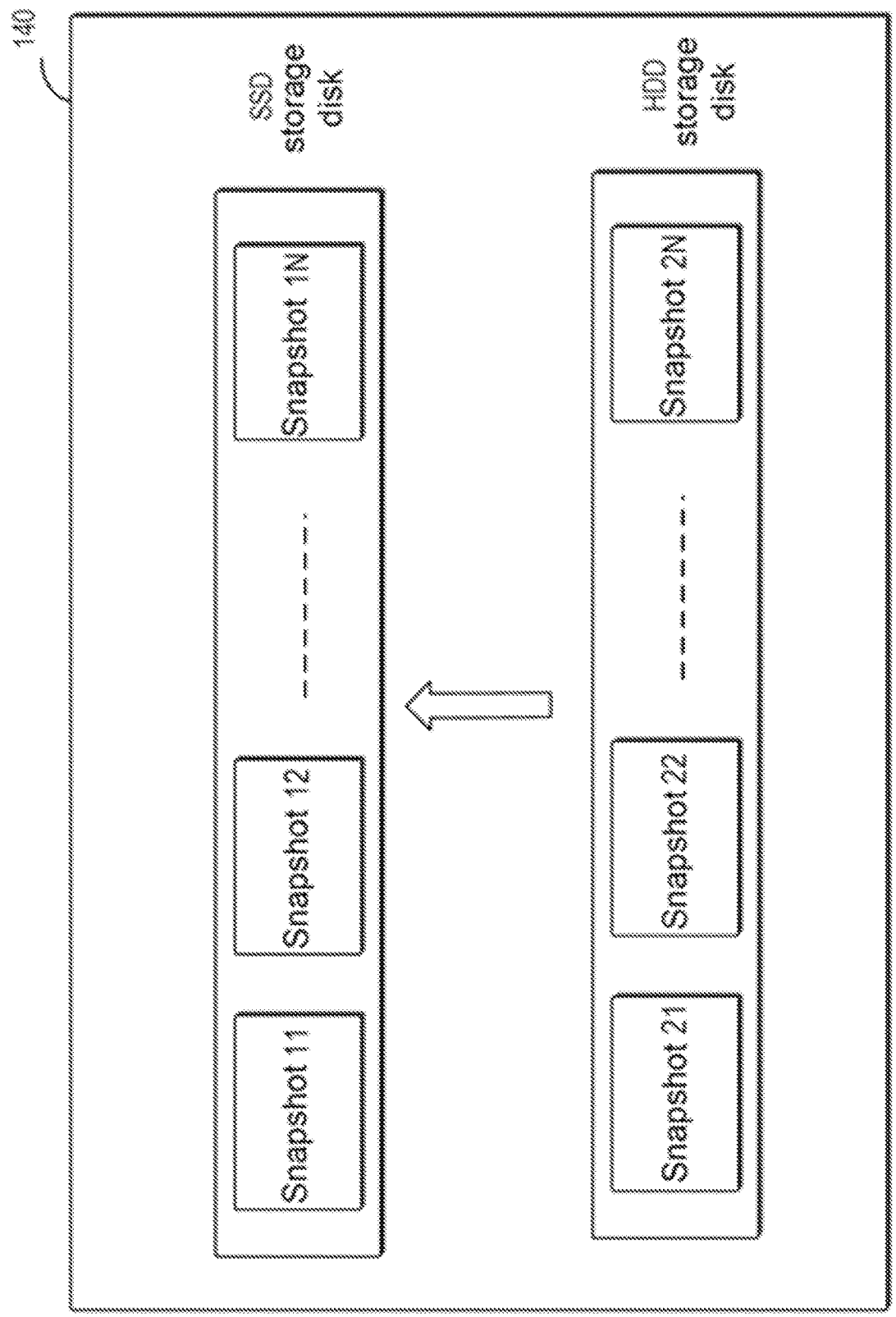
FIG. 6 shows a schematic block diagram of a source storage device to which the method according to an embodiment of the present disclosure can be applied.

FIG. 6 shows a schematic block diagram of a source storage device 140 to which the method according to an embodiment of the present disclosure may be applied. As shown in FIG. 6, the source storage device 140 may be a hybrid storage device, including a first-type storage disk and a second-type storage disk, wherein the performance of the first-type storage disk is better than that of the second-type storage disk. In some embodiments, the first-type storage disk may include an SSD, and the second-type storage disk may include an HDD. It may be understood that the source storage device 140 may also include other types of storage disks. Illustration will be made below by taking the SSD being the "first-type storage disk" and the HDD being the "second-type storage disk" as examples. It is understandable by those skilled in the art that this is not limited, as the first-type storage disk and the second-type storage disk may also include other types of storage disks, without being limited to SSD or HDD.

In some embodiments, the SSD storage disks may be arranged in tiers, and each tier includes a plurality of SSD storage disks. By type, the HDD storage disks may also be arranged in tiers, and each tier includes a plurality of HDD storage disks. As shown in FIG. 6, the SSD storage disk stores data. For data to be replicated to the destination storage device 160, that is, target data, it may be referred to as a "snapshot." The SSD storage disk stores target data (such as a snapshot 11, a snapshot 12, . . . , and a snapshot 1N), and the HDD storage disk also stores target data (such as a snapshot 21, a snapshot 22, . . . , and a snapshot 2N), as shown in FIG. 6.

In some embodiments, the computing device 120 may calculate an aging degree of the first-type storage disk (such as an SSD-type storage disk), and the aging degree characterizes an aging state of the first-type storage disk. Illustration will be made below by taking the first-type storage disk being an SSD-type storage disk as an example. However, it is understandable that the method for calculating the aging degree may also be applied similarly to other storage disks. Assuming that the source storage device 140 includes $N_s$ SSD storage disks, wherein each SSD storage disk has an aging degree being $d_n$, and the aging degree represents, for the SSD storage disk, a ratio of the current aging state of the SSD storage disk to a lifespan length of the SSD storage disk. For the source storage device 140, the aging degree of the SSD-type storage disk may be characterized by an equation (3) as follows:

$$d = \frac{\sum_{n=1}^{N_s} d_n}{N_s} \qquad (3)$$

In some embodiments, a preset aging degree $\sigma$ for the first-type storage disk (such as the SSD-type storage disk) may also be predetermined. If the aging degree d calculated according to the equation (3) is greater than or equal to the preset aging degree $\sigma$, that is, $d \geq \sigma$, it indicates that the aging degree of the first-type storage disk (such as the SSD-type storage disk) is relatively severe, and therefore, it can no longer accept or process migration data from other types (such as HDD) of storage disks to avoid the aggravation of the aging degree of the current first-type storage disk (such as the SSD-type storage disk). If the aging degree d calculated according to the equation (3) is less than the preset aging degree $\sigma$, that is, $d < \sigma$, it indicates that the aging degree of the first-type storage disk (such as the SSD-type storage disk) is relatively light, and therefore, it can accept or process migration data from other types (such as HDD) of storage disks.

Returning to FIG. 5, at a block 504, the computing device 120 may determine a transmission time length for replicating target data from a second-type storage disk in the source storage device 140 to the destination storage device 160, wherein the target data is stored in the second-type storage disk in the source storage device 140.

In some embodiments, during the execution of data replication, for an RPO time window $W_{RPO\_i}$, a plurality of data blocks (such as snapshot data) may be replicated in parallel to the destination storage device. The plurality of data blocks may come from one or a plurality of storage disks. For simplicity, illustration is made only by taking the target data being a data block i (or snapshot i) for the RPO time window $W_{RPO\_i}$ as an example. Correspondingly, the flow chart corresponding to the method 500 may be understood as an operation for the RPO time window $W_{RPO\_i}$. It is understandable that the method according to the embodiment of the present disclosure may be applied to any one or a plurality of time windows in the data replication process, and may be applied in parallel to any number of replicated data blocks, for example.

In some embodiments, the computing device 120 may calculate a transmission time length $t_{dt\_i}$ for replicating the target data from the second-type storage disk (such as the HDD-type storage disk) in the source storage device 140 to the destination storage device 160. Assuming that the data volume of the data block i of the target data is $D_i$ and an average transmission speed of data on a replication data link between the source storage device 140 and the destination storage device 160 is $f_{avg}$, and the transmission time length $t_{dt\_i}$ may be determined based on an equation (4):

$$t_{dt\_i} = \frac{D_i}{f_{avg}} \qquad (4)$$

In some embodiments, the transmission time length $t_{dt\_i}$ represents a transmission time length for replicating the data block i of the target data from the second-type storage disk (such as the HDD-type storage disk) of the source storage device 140 to the destination storage device 160.

At a block 506, the computing device 120 may determine to migrate the target data from the second-type storage disk to the first-type storage disk based on the transmission time length and the aging degree. Due to the method being able to target an RPO time window $W_{RPO\_i}$, and correspondingly, in some embodiments, the computing device 120 may determine, based on the transmission time length $t_{dt\_i}$ and the aging degree d for the RPO time window $W_{RPO\_i}$, to migrate the target data (such as the data block i or snapshot i) from the second-type storage disk (such as the HDD-type storage disk) to the first-type storage disk (such as the SSD-type storage disk). In other words, the operation of migrating the target data from the second-type storage disk to the second-type storage disk may be for the RPO time window $W_{RPO\_i}$. A specific implementation of an operation in 506 will be described in detail below with reference to the accompanying drawings.

At a block 508, the computing device 120 may replicate the target data (such as the data block i or snapshot i) from the first-type storage disk (such as the SSD-type storage disk) in the source storage device 140 to the destination storage device 160. In some embodiments, in response to triggering at the moment for the RPO time window $W_{RPO\_i}$, the computing device 120 may replicate the target data (such as the data block i or snapshot i) from the first-type storage disk (such as the SSD-type storage disk) in the source storage device 140 to the destination storage device 160 within the RPO time window WRPO.

In some embodiments, the transmission time length for the target data to be replicated from the first-type storage disk in the source storage device 140 to the destination storage device 160 is shorter than the transmission time length for the target data to be replicated from the second-type storage disk in the source storage device 140 to the destination storage device 160. Advantageously, before the RPO is triggered and the data replication begins, by migrating the target data (such as the data block i or snapshot i) from the second-type storage disk (such as the HDD-type storage disk) to the first-type storage disk (such as the SSD-type storage disk), the target data may be replicated to the destination storage device starting from a relatively high-performance first-type storage disk in the source storage device 140. As a result, it can significantly improve the data replication efficiency, reduce the possibility of data loss, and thus significantly improve the performance of the storage system.

A specific implementation process of the calculation device 120 determining, based on the transmission time length $t_{dt\_i}$ and the aging degree d, to migrate the target data (such as the data block i or snapshot i) from the second-type storage disk (such as the HDD-type storage disk) to the first-type storage disk (such as the SSD-type storage disk) will be described in detail below with reference to the accompanying drawings.

Figure 7:
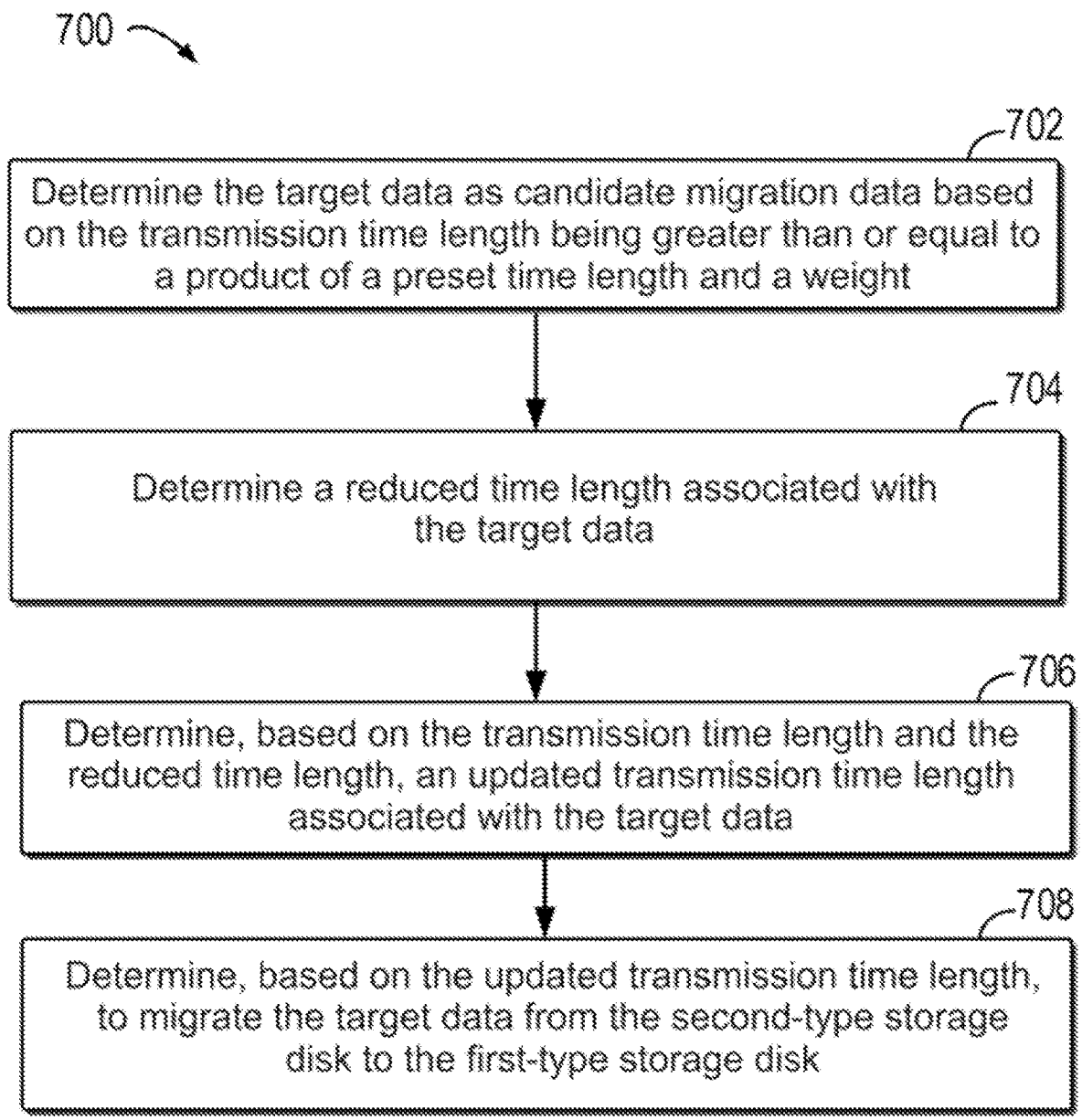
FIG. 7 shows a flow chart of an implementation process of migrating target data from a second-type storage disk to a first-type storage disk according to an embodiment of the present disclosure.

FIG. 7 shows a flow chart of an implementation process of migrating target data from a second-type storage disk to a first-type storage disk according to an embodiment of the present disclosure. As shown in FIG. 7, at a block 702, a computing device 120 determines the target data as candidate migration data based on a transmission time length (for example, the transmission time length $t_{dt\_i}$ calculated at the block 504) being greater than or equal to a product of a preset time length and a weight.

In some embodiments, the preset time length corresponds to the RPO time length, that is, the time length of the RPO time window, for example, the time length of the RPO time window $W_{RPO\_i}$, which may be expressed as $T_{RPO\_i}$ here. The weight may be expressed as θ, wherein 0<θ≤1. The computing device 120 may compare the transmission time length $t_{dt\_i}$ with the product of the RPO time length and the weight θ*$T_{RPO\_i}$.

When $t_{dt\_i}$<θ*$T_{RPO\_i}$, it indicates that the transmission time length is less than the product of the RPO time length and the weight θ*$T_{RPO\_i}$. The computing device 120 may estimate that within the RPO time window $W_{RPO\_i}$, there is a relatively small probability that the replicated data will be lost due to the failure of the source storage device 140. When $t_{dt\_i}$≥θ*$T_{RPO\_i}$, it indicates that the transmission time length is greater than the product of the RPO time length and the weight θ*$T_{RPO\_i}$. The computing device 120 may estimate that within the RPO time window $W_{RPO\_i}$, there is a relatively high probability that the replicated data will be lost due to the failure of the source storage device 140. In this case, the computing device 120 determines the target data of the data block i as candidate migration data.

At a block 704, the computing device 120 may determine the reduced time length associated with the target data. The read and write speed of the first-type storage disk is faster than the read and write speed of the second-type storage disk, and therefore, the reduced time length $t_{s\_i}$ represents: the transmission time length saved by replicating the target data from the first-type storage disk in the source storage device 140 to the destination storage device 160 compared with from the second-type storage disk in the source storage device 140.

In some embodiments, when the reduced transmission time length $t_{s\_i}$ is calculated, the computing device 120 may obtain the data volume of the target data. For example, for the target data of the data block i, the data volume may be acquired as $D_i$. The computing device 120 may determine a per-operation average read volume of read operations (such as one or a plurality of read operations required for reading the target data) from the destination storage device 160 for the target data. For example, the destination storage device 160 may perform a plurality of read operations on the target data to achieve full reading of the target data, and the data volume read in every read operation is the average read volume per operation. The per-operation average read volume may be determined based on actual needs of the storage system 100, which is not limited in the present disclosure. In addition, the per-operation average read volume may also be determined based on a ratio of the data volume read by a plurality of read operations to the number of reads. Here, the per-operation average read volume may be expressed as $S_{r\_b}$. Furthermore, the computing device 120 may further determine a first response time $t_{sdd}$ and a second response time $t_{hdd}$ of the first-type storage disk and the second-type storage disk for the read operation (such as one or a plurality of read operations required for reading the target data), respectively.

Therefore, the computing device 120 may determine the reduced time length $t_{s\_i}$ based on the data volume $D_1$, the per-operation average read volume $S_{r\_b}$, the first response time $t_{sdd}$, and the second response time $t_{hdd}$, as represented by an equation (5):

$$t_{s\_i} = \frac{D_i}{S_{r\_b}} * (t_{hdd} - t_{ssd}) \qquad (5)$$

As shown in the equation (5), the reduced transmission time length may be expressed as: the transmission time length saved by replicating the target data from the first-type storage disk in the source storage device 140, compared with from the second-type storage disk in the source storage device 140, to the destination storage device 160.

After the computing device 120 determines the transmission time length $t_{s\_i}$ for replicating the target data from the first-type storage disk of the source storage device 140 to the destination storage device 160, the computing device 120 may further determine an updated transmission time length associated with the target data based on the transmission time length and the reduced time length at a block 706. In some embodiments, the computing device 120 may determine the updated transmission time length $t_{p\_i}$ based on an equation (6).

$$t_{p\_i} = t_{dt\_i} - t_{s\_i} \qquad (6)$$

As shown in the equation (6), the updated time length may represent the transmission time length required for replicating the target data from the first-type storage disk in the source storage device 140 to the destination storage device 160. Therefore, it may be further determined that the transmission time length $t_{s\_i}$ for replicating the target data from the first-type storage disk of the source storage device 140 to the destination storage device 160 is less than the transmission time length $t_{p\_i}$ for replicating the target data from the second-type storage disk of the source storage device 140 to the destination storage device 160.

The computing device 120 may determine to migrate the target data from the second-type storage disk to the first-type storage disk based on the updated transmission time length at a block 708. In some embodiments, the computing device 120 may compare the updated transmission time length $t_{p\_i}$ calculated in the equation (6) with the preset time length $T_{RPO\_i}$ (that is, the RPO time length or the corresponding time length of the RPO time window). When the updated transmission time length $t_{p\_i}$ is greater than or equal to the preset time length $T_{RPO\_i}$ ($t_{p\_i} \geq T_{RPO\_i}$), it indicates that even if the target data is migrated from the second-type storage disk to the first-type storage disk, the required transmission time is still greater than the time length corresponding to the time window $W_{RPO\_i}$ of the RPO, and there is still a high probability that the target data will be lost. In this case, the computing device 120 will avoid or not perform the operation of migrating the target data from the second-type storage disk to the first-type storage disk, so as to save computing resources.

In some embodiments, when the updated transmission time length $t_{p\_i}$ is less than the preset time length $T_{RPO\_i}$ ($t_{p\_i} < T_{RPO\_i}$), it indicates that the transmission time required for migrating the target data from the second-type storage disk to the first-type storage disk will be less than the time length corresponding to the RPO time window $W_{RPO\_i}$. In this case, the computing device 120 will further determine whether to migrate the target data from the second-type storage disk to the first-type storage disk by combining with the aging degree d obtained according to the equation (3) at the block 502. If the aging degree d of the first-type storage disk calculated according to the equation (3) is less than the preset aging degree σ, that is, d<σ, it indicates that the aging degree of the first-type storage disk (such as the SSD-type storage disk) is relatively low, and therefore, the computing device 120 determines that the target data may be migrated from the second-type storage disk to the first-type storage disk. If the calculation device 120 determines that the aging degree d calculated according to the equation (3) is greater than or equal to the preset aging degree σ, that is, d≥σ, it indicates that the aging degree of the first-type storage disk (such as the SSD-type storage disk) is relatively severe, and therefore, the computing device 120 does not perform the operation of migrating the target data from the second-type storage disk to the first-type storage disk to avoid the aggravation of the aging degree of the current SSD-type storage disk.

It is understandable that when determining that $t_{p\_i}$ is less than the preset time length $T_{RPO\_i}$ and the aging degree d of the first-type storage disk is less than the preset aging degree σ, the computing device 120 may migrate the target data as candidate migration data from the second-type storage disk to the first-type storage disk within the RPO time window $W_{RPO\_i}$. When determining that $t_{p\_i}$ is greater than or equal to the preset time length $T_{RPO\_i}$, the computing device 120 may avoid or not perform the operation of migrating the target data as the candidate migration data from the second-type storage disk to the first-type storage disk to save computing resources. In addition, when determining that the aging degree d of the first-type storage disk is greater than or equal to the preset aging degree σ, the computing device 120 may not perform the operation of migrating the target data from the second-type storage disk to the first-type storage disk to avoid worsening the aging degree of the current first-type storage disk.

In some embodiments, when the computing device 120 determines to migrate the target data from the second-type storage disk to the first-type storage disk within the RPO time window $W_{RPO\_i}$, the computing device 120 may further determine a migration start moment $t_{tp\_i}$ within the RPO time window $W_{RPO\_i}$ for which the data replication operation is targeted. Within the RPO time window $W_{RPO\_i}$, the migration start moment $t_{tp\_i}$ and a time period before the migration start moment $t_{tp\_i}$ may all be used for migrating the target data from the second-type storage disk to the first-type storage disk. A specific implementation process of calculating the migration start moment $t_{tp\_i}$ will be described below with reference to the flow chart in FIG. 8.

Figure 8:
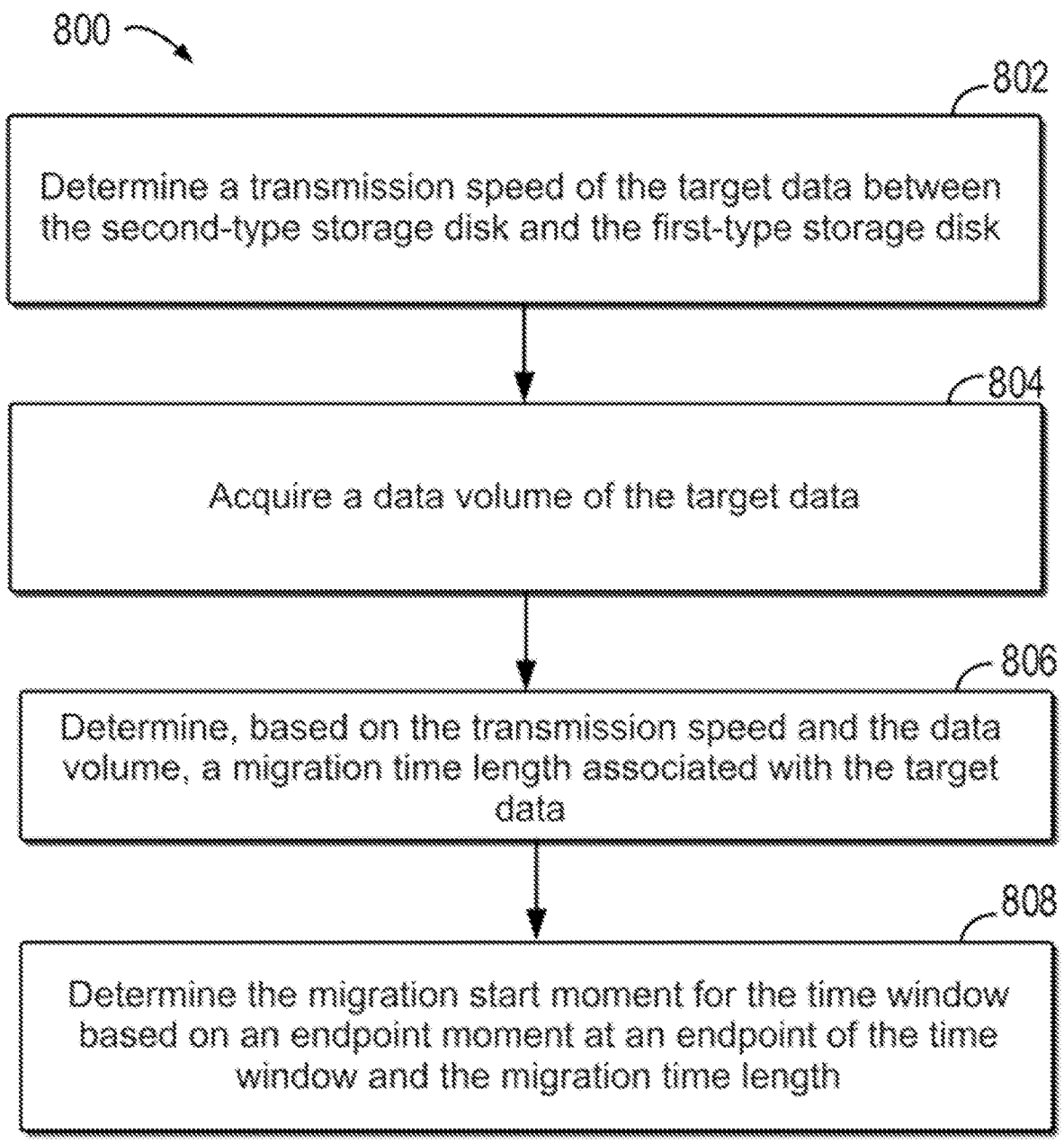
FIG. 8 shows a flow chart of an implementation process of calculating a migration start moment according to an embodiment of the present disclosure.

FIG. 8 shows a flow chart 800 of a specific implementation process of calculating the migration start moment $t_{tp\_i}$ according to an embodiment of the present disclosure. In FIG. 8, at a block 802, the computing device 120 may determine a transmission speed $f_r$ of the target data between the second-type storage disk and the first-type storage disk. At a block 804, the computing device 120 acquires a data volume of the target data. Still using the above example as an example, for example, the data volume is $D_i$.

At a block 806, the computing device 120 may determine a migration time length $t_{tp\_i}$ associated with the target data based on the transmission speed $f_r$ and the data volume $D_i$. In some embodiments, the computing device 120 may determine the migration time length $t_{r\_i}$ based on an equation (7):

$$t_{r\_i} = \frac{D_i}{f_r}. \qquad (7)$$

It is understandable that the migration time length $t_{r\_i}$ calculated according to the equation (7) may represent the time length required for migrating the target data from the second-type storage disk in the source storage device 140 to the first-type storage disk.

At a block 808, the computing device 120 may determine the migration start moment in the RPO time window based on an endpoint moment at an endpoint of the RPO time window $W_{RPO\_i}$ and the migration time length. An example implementation of determining the migration start moment $t_{tp\_i}$ in the RPO time window will be described below with reference to FIG. 9.

Figure 9:
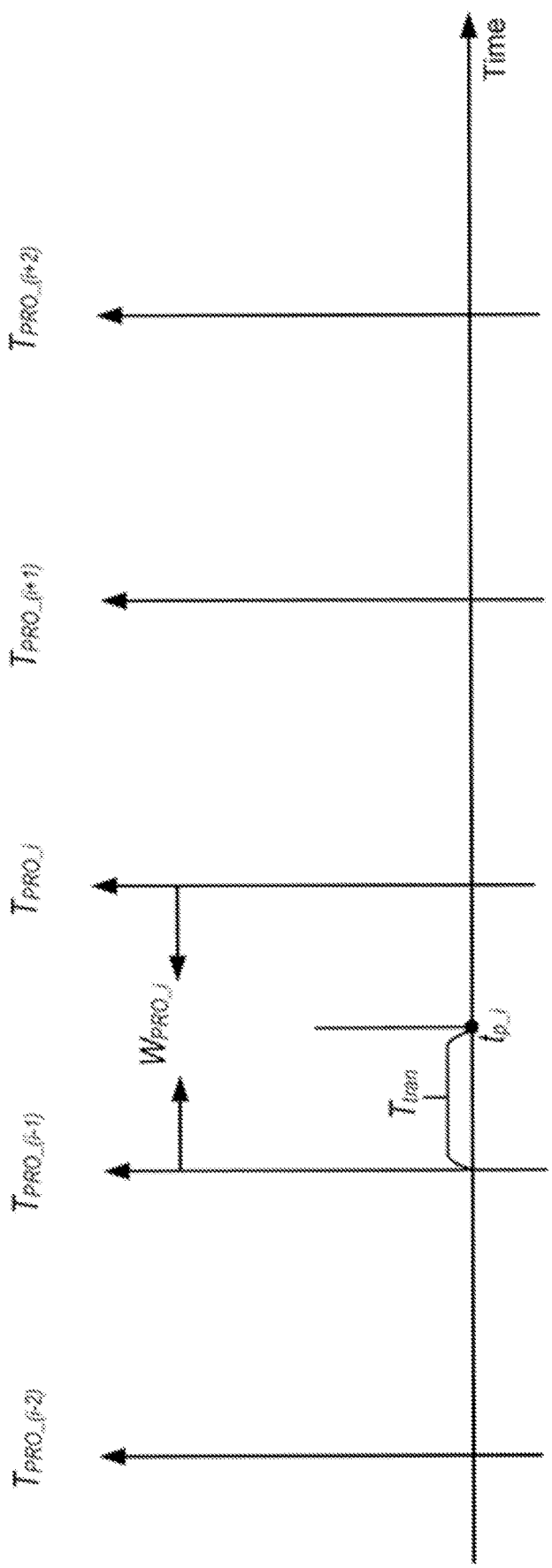
FIG. 9 shows an example implementation process of determining a migration start moment for an RPO time window according to an embodiment of the present disclosure.

FIG. 9 shows an example implementation process of determining a migration start moment $t_{tp\_i}$ in one RPO time window according to an embodiment of the present disclosure. In FIG. 9, illustration is made by taking a time window $W_{RPO\_i}$ defined by two adjacent PRO triggering moments (for example, a moment $T_{RPO\_(i-1)}$ and a moment $T_{RPO\_i}$) as an example.

The migration time length $t_{r\_i}$ calculated by the computing device 120 according to the equation (7) at the block 806 represents the time length required for migrating the target data from the second-type storage disk in the source storage device 140 to the first-type storage disk. Therefore, in order to ensure that the target data may be fully migrated to the first-type storage disk before the next RPO trigger arrives, for the RPO time window $W_{RPO\_i}$, two port moments of the time window are a moment $T_{RPO\_(i-1)}$ and a moment $T_{RPO\_i}$, respectively. The moment $T_{RPO\_i}$ is the next RPO triggering moment. In this case, the computing device 120 may determine the migration start moment $t_{tp\_i}$ based on an endpoint moment at an endpoint of the RPO time window $W_{RPO\_i}$ and the determined migration time length. Specifically, the computing device 120 may determine the migration start moment $t_{tp\_i}$ in the RPO time window based on a difference between an endpoint moment $T_{RPO\_i}$ at a right endpoint (representing the end of the RPO time window $W_{RPO\_i}$) of the RPO time window $W_{RPO\_i}$ and the migration time length $t_{r\_i}$, as shown in an equation (8):

$$t_{tp\_i} = T_{RPO\_i} - t_{r\_i} \quad (8)$$

The migration start moment $t_{tp\_i}$ calculated according to the equation (8) may represent a start moment of migrating the target data from the second-type storage disk to the first-type storage disk. It is understandable that a time period before the migration start moment $t_{tp\_i}$ and a time period from the previous to a start endpoint moment $T_{RPO\_(i-1)}$ of the RPO time window may all be used for migrating the target data. In other words, the data migration operation may be triggered at any moment before the migration start moment $t_{tp\_i}$ (which may include the migration start moment $t_{tp\_i}$) and after the triggering moment $T_{RPO\_(i-1)}$ of the RPO time window $W_{RPO\_i}$ (which may include the triggering moment $T_{RPO\_(i-1)}$).

It is understandable that the above only describes the process of determining the migration start moment for one RPO time window. During the remaining RPO time windows in the data replication process, a process similar to the flow chart in FIG. 8 may be sampled to determine the migration start moment within each RPO time window.

For the method according to the embodiment of the present disclosure, by migrating the target data from the second-type storage disk having relatively low performance to the first-type storage disk having relatively high performance before data replication, the data replication efficiency may be significantly improved, and the possibility of data loss may be reduced, thereby significantly improving the performance of the storage system.

Figure 10:
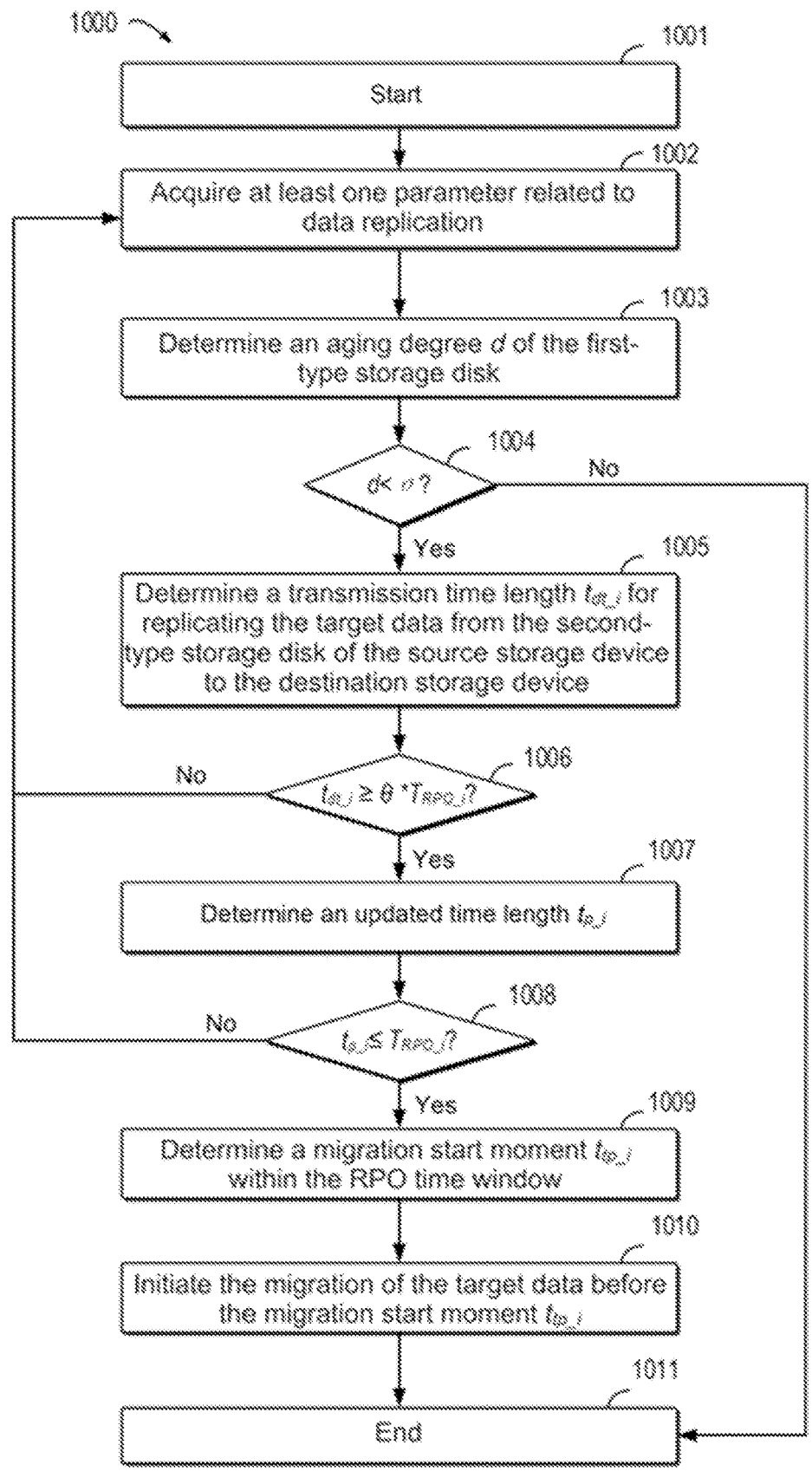
FIG. 10 shows a schematic flow chart of a data replication process according to an embodiment of the present disclosure.

FIG. 10 shows a schematic flow chart of a data replication process according to an embodiment of the present disclosure. The flow chart 1000 in FIG. 10 may be performed at the computing device 120 in the storage system 100 in FIG. 1 or any suitable computing device for replicating the target data from the source storage device 140 to the destination storage device 160. The method 1000 may be a data replication operation method about the target data for the RPO time window $W_{RPO\_i}$. It is understandable that steps in the method 1000 may be obtained with reference to the description of the corresponding parts above.

As shown in FIG. 10, the method starts from 1001. At a block 1002, the computing device 120 acquires at least one parameter related to data replication. In some embodiments, the at least one parameter related to data replication may include, but is not limited to, an aging degree $d_n$ of each SSD storage disk in the source storage device 140, a time length $T_{RPO\_i}$ of a predetermined PRO time window, a data volume $D_i$ of target data (for example, the data block i), a first response time $t_{sdd}$ of a first-type storage disk to a read operation, a second response time $t_{hdd}$ of a second-type storage disk to the read operation, and a transmission speed $f_r$ of the target data between the second-type storage disk and the first-type storage disk.

At a block 1003, the computing device 120 may determine the aging degree d of the first-type storage disk in the source storage device 140. In some embodiments, the computing device may determine the aging degree d of the first-type storage disk based on the formula (3). At 1004, the computing device 120 may compare the aging degree d of the first-type storage disk with a preset aging degree σ. When the aging degree d of the first-type storage disk is greater than or equal to the preset aging degree σ, the process proceeds to a block 1011, and the data replication process for the target data ends. When the aging degree d of the first-type storage disk is less than the preset aging degree σ, the process proceeds to a block 1005.

At the block 1005, the computing device 120 may determine a transmission time length $t_{dt\_i}$ for replicating the target data from the second-type storage disk of the source storage device 140 to the destination storage device 160. In some embodiments, the computing device 120 may calculate the transmission time length $t_{dt\_i}$ based on the equation (4). For the specific determination process, reference may be made to the above description for the equation (4), which is not repeated here for brevity.

At 1006, the computing device may compare the transmission time length $t_{dt\_i}$ with a product of the time length $T_{RPO\_i}$ of the RPO time window $W_{RPO\_i}$ and a weight θ. In some embodiments, the method 1000 may be an operation method for the RPO time window $W_{RPO\_i}$. When the transmission time length $t_{dt\_i}$ is less than the product of the RPO time length $T_{RPO\_i}$ and the weight θ, the process returns to the block 1002, and at least one parameter related to the data replication of the next piece of target data (such as a data block i+1) is acquired. When the transmission time length $t_{dt\_i}$ is greater than or equal to the product of the RPO time length $T_{RPO\_i}$ and the weight θ, the process proceeds to a block 1007. At the block 1007, the computing device 120 may determine an updated transmission time length $t_{p\_i}$. The updated transmission time length $t_{p\_i}$ may represent the transmission time length required for replicating the target data from the first-type storage disk in the source storage device 140 to the destination storage device 160. Moreover, the updated transmission time length $t_{p\_i}$ may be determined based on formulas (5) and (6) and in combination with the relevant descriptions above. For the sake of brevity, this will not be repeated here.

At 1008, the computing device 120 may compare the updated transmission time length $t_{p\_i}$ with the preset time length $T_{RPO\_i}$ (that is, the RPO time length or the corresponding time length of the RPO time window $W_{RPO\_i}$). When the updated transmission time length $t_{p\_i}$ is greater than the preset time length $T_{RPO\_i}$, the process returns to the block 1002, and at least one parameter related to the data replication of the next piece of target data is acquired at the block 1002. When the updated transmission time length $t_{p\_i}$ is less than or equal to the preset time length $T_{RPO\_i}$, the process proceeds to a block 1009.

In some embodiments, when the updated transmission time length $t_{p\_i}$ is less than or equal to the preset time length $T_{RPO\_i}$, the computing device 120 determines that it intends to migrate the target data from the second-type storage disk to the first-type storage disk within the RPO time window $T_{RPO\_i}$. Moreover, at the block 1009, the computing device 120 may determine a migration start moment $t_{tp\_i}$ within the RPO time window $W_{RPO\_i}$ for which the data replication operation is targeted. In some embodiments, the computing device 120 may determine the migration start moment $t_{tp\_i}$ based on the equations (7) to (8).

Afterwards, at a block 1010, the computing device 120 may initiate the migration of the target data at any moment before the migration start moment $t_{tp\_i}$ (which may include the migration start moment $t_{tp\_i}$) within the RPO time window $W_{RPO\_i}$ for which the data replication operation is targeted, thereby migrating the target data from the second-type storage disk in the source storage device to the first-type storage disk in the source storage device.

Afterwards, the process proceeds to a block 1011, and the data replication operation about the target data for the RPO time window $W_{RPO\_i}$ ends.

Advantageously, by adopting the data replication method disclosed in the present disclosure to migrate the target data from the second-type storage disk having relatively low performance to the first-type storage disk having relatively high performance before data replication, the data replication efficiency can be significantly improved, and the possibility of data loss can be reduced, thereby significantly improving the performance of the storage system.

Table 1 shows comparisons of replication time and replication speed when replicating target data from an SSD, as compared with an HDD-type storage disk, to the destination storage device. As can be seen from Table 1, replicating the target data from the SSD to the destination storage device takes significantly less time than replicating from the HDD to the destination storage device. Therefore, by migrating the target data from the second-type storage disk having relatively low performance to the first-type storage disk having relatively high performance, the performance and reliability of asynchronous data replication can be significantly improved.

TABLE 1

| Storage disk type | Raid type | Number of disks | Replicated data volume (GB) | Replication time (S) | Replication speed (MB/S) |
|---|---|---|---|---|---|
| NL-SAS | Raid6 | 7 | 102.4 | 802 | 130.75 |
| SAS | Raid6 | 7 | 102.4 | 602 | 174.18 |
| SSD | Raid6 | 7 | 102.4 | 162 | 647.27 |

Figure 11:
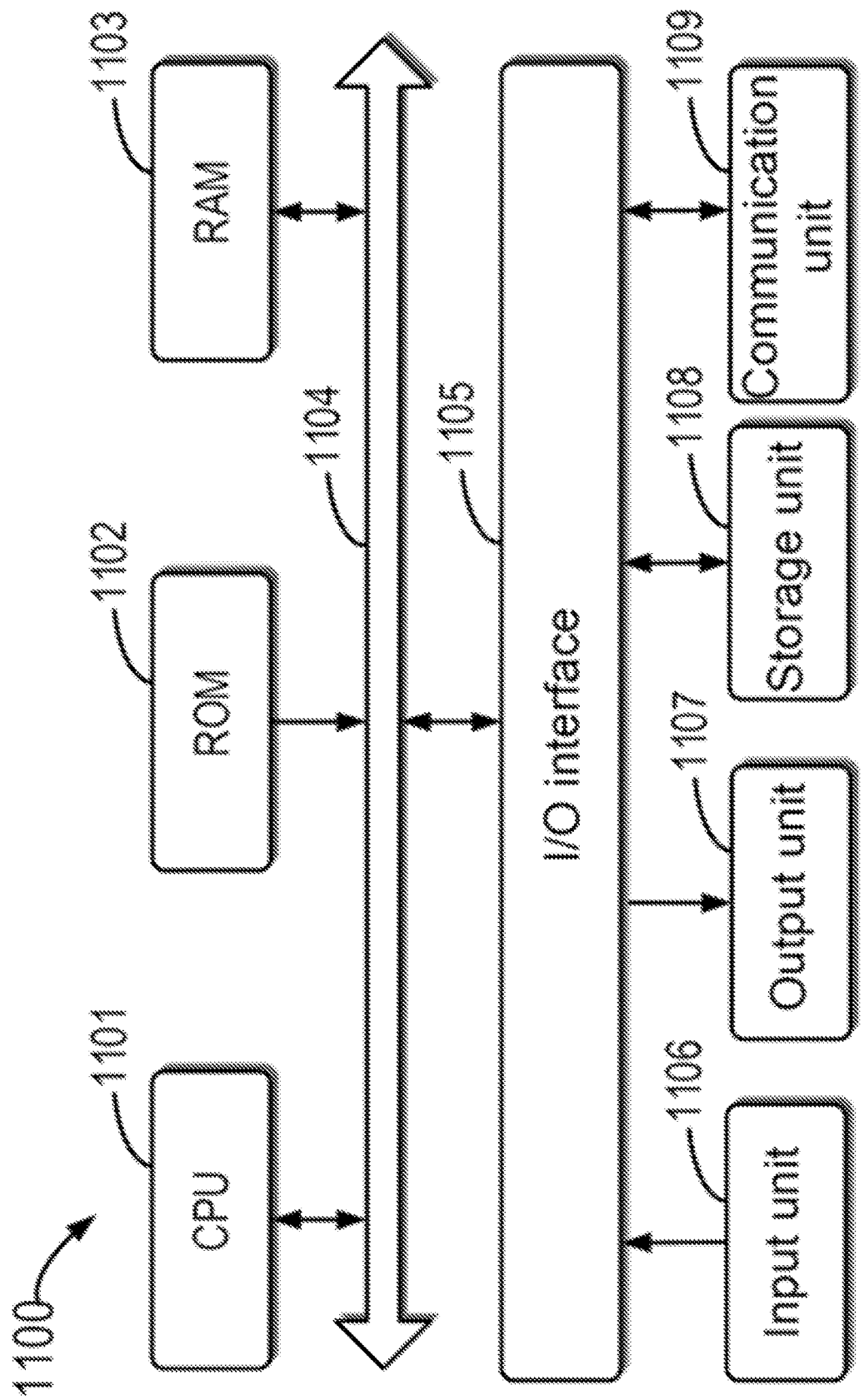
FIG. 11 is a schematic block diagram of an example device suitable for implementing content of the present disclosure.

FIG. 11 illustrates a schematic block diagram of an example device 1100 that may be used to implement an embodiment of the present disclosure. A computing device 120 in FIG. 1 may be implemented by using the device 1100. As shown in the figure, the device 1000 includes a central processing unit (CPU) 1101 that can perform various appropriate actions and processing according to computer program instructions stored in a read-only memory (ROM) 1102 or loaded from a storage unit 508 into a random access memory (RAM) 1103. Various programs and data required for the operation of the device 1100 may also be stored in the RAM 1103. The CPU 1101, the ROM 1102, and the RAM 1103 are connected to each other through a bus 1104. An input/output (I/O) interface 1105 is also connected to the bus 1104.

A plurality of components in the device 1100 are connected to the I/O interface 1105, including: an input unit 1106, such as a keyboard and a mouse; an output unit 1107, such as various types of displays and speakers; a memory page 1108, such as a disk and an optical disc; and a communication unit 1109, such as a network card, a modem, and a wireless communication transceiver. The communication unit 1109 allows the device 1100 to exchange information/data with other devices through a computer network such as the Internet and/or various telecommunication networks.

The various processes and processing described above, such as the methods 500, 700 to 800, and 1000, may be performed by the processing unit 1101. For example, in some embodiments, the methods 500, 700 to 800, and 1000 may be implemented as a computer software program that is tangibly included in a machine-readable medium such as the storage unit 1108. In some embodiments, part or all of the computer program may be loaded and/or mounted to the device 500 via the ROM 1102 and/or the communication unit 1109. When the computer program is loaded to the RAM 1103 and executed by the CPU 1101, one or more actions in methods 500, 700 to 800, and 1000 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/ processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, another programmable data processing apparatus, or another device, so that a series of operating steps can be performed on the computer, the other programmable data processing apparatus, or the other device to produce a computer-implemented process, such that the instructions executed on the computer, the other programmable data processing apparatus, or the other device can implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

What is claimed is:

1. A method, comprising:
   determining, by a system comprising at least one processor, an aging degree of a first-type storage disk in a source storage device;
   determining, by the system, a transmission time length for replication of target data from a second-type storage disk in the source storage device to a destination storage device, wherein the target data is stored in the second-type storage disk in the source storage device;
   determining, by the system, based on the transmission time length and the aging degree, to migrate the target data from the second-type storage disk to the first-type storage disk, wherein the determining to migrate the target data from the second-type storage disk to the first-type storage disk comprises:
   determining, by the system, the target data as candidate migration data based on the transmission time length being determined to be greater than or equal to a product of a preset time length and a weight,
   determining, by the system, a reduced time length associated with the target data,
   determining, by the system, based on the transmission time length and the reduced time length, an updated transmission time length associated with the target data, and
   determining, by the system, based on the updated transmission time length, to migrate the target data from the second-type storage disk to the first-type storage disk; and replicating, by the system, the target data from the first-type storage disk in the source storage device to the destination storage device.

2. The method according to claim 1, wherein the determining, based on the updated transmission time length, to migrate the target data from the second-type storage disk to the first-type storage disk comprises:
   migrating, by the system, based on the updated transmission time length being determined to be less than the preset time length and the aging degree is determined to be less than a preset aging degree, the target data as the candidate migration data from the second-type storage disk to the first-type storage disk.

3. The method according to claim 1, wherein determining the reduced time length comprises:
   acquiring, by the system, a data volume of the target data;
   determining, by the system, a per-operation average read volume of read operations from the destination storage device for the target data;
   determining, by the system, a first response time and a second response time of the first-type storage disk and the second-type storage disk for the read operation, respectively; and
   determining, by the system, the reduced time length based on the data volume, the per-operation average read volume, the first response time, and the second response time.

4. The method according to claim 1, wherein determining the updated transmission time length comprises:
   using, by the system, a difference between the transmission time length and the reduced time length as the updated transmission time length.

5. The method according to claim 1, wherein the preset time length corresponds to a length of a preset time window, and the method further comprises:
   determining, by the system, for the preset time window, a migration start moment for migration of the target data from the second-type storage disk to the first-type storage disk in the source storage device.

6. The method according to claim 5, wherein determining the migration start moment comprises:
   determining, by the system, a transmission speed of the target data between the second-type storage disk and the first-type storage disk;
   acquiring, by the system, a data volume of the target data;
   determining, by the system, based on the transmission speed and the data volume, a migration time length associated with the target data; and
   determining, by the system, the migration start moment for the preset time window based on an endpoint moment at an endpoint of the preset time window and the migration time length.

7. The method according to claim 1, wherein determining the transmission time length comprises:
   acquiring, by the system, a data volume of the target data;
   determining, by the system, an average transmission speed of the target data between the source storage device and the destination storage device; and
   determining, by the system, the transmission time length based on the data volume and the average transmission speed.

8. The method according to claim 1, wherein the transmission time length is a first transmission time length, and the method further comprising:
   determining, by the system, a second transmission time length of the target data being replicated from the first-type storage disk in the source storage device to the destination storage device, and wherein the determining to migrate the target data from the second-type storage disk to the first-type storage disk is further based on determining that the second transmission time length is shorter than the first transmission time length.

9. The method according to claim 1, wherein the first-type storage disk comprises a solid-state drive, and the second-type storage disk comprises a mechanical hard disk drive.

10. A device, comprising:
   at least one processor; and
   at least one memory, the at least one memory being coupled to the at least one processor and storing instructions used for being executed by the at least one processor, wherein the instructions, when executed by the at least one processor, cause the device to perform actions comprising:
      determining an aging degree of a first-type storage disk in a source storage device;
      determining a transmission time length applicable to replication of target data from a second-type storage disk in the source storage device to a destination storage device, wherein the target data is stored in the second-type storage disk in the source storage device;
      determining, based on the transmission time length and the aging degree, to migrate the target data from the second-type storage disk to the first-type storage disk, wherein the determining to migrate the target data from the second-type storage disk to the first-type storage disk comprises:
         determining the target data as candidate migration data based on the transmission time length being determined to be greater than or equal to a product of a preset time length and a weight,
         determining a reduced time length associated with the target data,
         determining, based on the transmission time length and the reduced time length, an updated transmission time length associated with the target data, and
         determining, based on the updated transmission time length, to migrate the target data from the second-type storage disk to the first-type storage disk; and
      replicating the target data from the first-type storage disk in the source storage device to the destination storage device.

11. The device according to claim 10, wherein the determining, based on the updated transmission time length, to migrate the target data from the second-type storage disk to the first-type storage disk comprises:
   migrating, based on the updated transmission time length being less than the preset time length and the aging degree is less than a preset aging degree, the target data as the candidate migration data from the second-type storage disk to the first-type storage disk.

12. The device according to claim 10, wherein determining the reduced time length comprises:
   acquiring a data volume of the target data;
   determining a per-operation average read volume of read operations from the destination storage device for the target data;
   determining a first response time and a second response time of the first-type storage disk and the second-type storage disk for the read operation, respectively; and
   determining the reduced time length based on the data volume, the per-operation average read volume, the first response time, and the second response time.

13. The device according to claim 10, wherein determining the updated transmission time length comprises:
using a difference between the transmission time length and the reduced time length as the updated transmission time length.

14. The device according to claim 10, wherein the preset time length corresponds to a length of a preset time window, and wherein the actions further comprise:
determining, for the preset time window, a migration start moment for migration of the target data from the second-type storage disk to the first-type storage disk in the source storage device.

15. The device according to claim 14, wherein determining the migration start moment comprises:
determining a transmission speed of the target data between the second-type storage disk and the first-type storage disk;
acquiring a data volume of the target data;
determining, based on the transmission speed and the data volume, a migration time length associated with the target data; and
determining the migration start moment for the preset time window based on an endpoint moment at an endpoint of the preset time window and the migration time length.

16. The device according to claim 10, wherein the transmission time length is a first transmission time length, and wherein the actions further comprise:
determining a second transmission time length of the target data being replicated from the first-type storage disk in the source storage device to the destination storage device, wherein the determining to migrate the target data from the second-type storage disk to the first-type storage disk is further based on determining that the second transmission time length is shorter than the first transmission time length.

17. A computer program product, the computer program product being stored on a non-transitory computer-readable medium and comprising machine-executable instructions, wherein the machine-executable instructions, when executed, cause a machine to perform operations, comprising:
determining an aging degree of a first-type storage disk in a source storage device;
determining a transmission time length for replicating target data from a second-type storage disk in the source storage device to a destination storage device, wherein the target data is stored in the second-type storage disk in the source storage device;
determining, based on the transmission time length and the aging degree, to migrate the target data from the second-type storage disk to the first-type storage disk, wherein the determining to migrate the target data from the second-type storage disk to the first-type storage disk comprises:
determining the target data as candidate migration data based on the transmission time length being determined to be greater than or equal to a product of a preset time length and a weight,
determining a reduced time length associated with the target data,
determining, based on the transmission time length and the reduced time length, an updated transmission time length associated with the target data, and
determining, based on the updated transmission time length, to migrate the target data from the second-type storage disk to the first-type storage disk; and
replicating the target data from the first-type storage disk in the source storage device to the destination storage device.

18. The computer program product according to claim 17, wherein determining the transmission time length comprises:
acquiring a data volume of the target data;
determining an average transmission speed of the target data between the source storage device and the destination storage device; and
determining the transmission time length based on the data volume and the average transmission speed.

19. The computer program product according to claim 17, wherein the determining, based on the updated transmission time length, to migrate the target data from the second-type storage disk to the first-type storage disk comprises:
migrating, based on the updated transmission time length being determined to be less than the preset time length and the aging degree is determined to be less than a preset aging degree, the target data as the candidate migration data from the second-type storage disk to the first-type storage disk.

20. The computer program product according to claim 17, wherein determining the reduced time length comprises:
acquiring a data volume of the target data;
determining a per-operation average read volume of read operations from the destination storage device for the target data;
determining a first response time and a second response time of the first-type storage disk and the second-type storage disk for the read operation, respectively; and
determining the reduced time length based on the data volume, the per-operation average read volume, the first response time, and the second response time.

\* \* \* \* \*